April 29, 1952 H. F. KUHLOW 2,595,197

SAFETY DEVICE FOR MAGNETIC RECORD ERASING

Filed April 28, 1951 3 Sheets-Sheet 1

Herbert F. Kuhlow
*INVENTOR.*

*BY* [signature]

[signature]

ATTORNEYS

April 29, 1952 H. F. KUHLOW 2,595,197

SAFETY DEVICE FOR MAGNETIC RECORD ERASING

Filed April 28, 1951 3 Sheets-Sheet 2

Herbert F. Kuhlow
INVENTOR.

BY [signatures]

ATTORNEYS

April 29, 1952 H. F. KUHLOW 2,595,197

SAFETY DEVICE FOR MAGNETIC RECORD ERASING

Filed April 28, 1951 3 Sheets-Sheet 3

Herbert F. Kuhlow
*INVENTOR.*

BY

ATTORNEYS

Patented Apr. 29, 1952

2,595,197

UNITED STATES PATENT OFFICE 2,595,197

SAFETY DEVICE FOR MAGNETIC RECORD ERASING

Herbert F. Kuhlow, Park Ridge, Ill., assignor to Ampro Corporation, Chicago, Ill., a corporation of Illinois Application April 28, 1951, Serial No. 223,566

3 Claims. (Cl. 179—100.2)

The present invention relates to magnetic recording upon elongate and flexible magnetizable record bodies that are drawn past a recording head that is energized by a varying current to produce at the non-magnetic gap of a magnetic circuit element a field of variable intensity to which the record body is exposed as it travels past. As a preliminary step to accomplishing recording in this way, it is usual to subject the record body to an erasing procedure just prior to passage of the body past the non-magnetic gap of the recording head. The usual erasing procedure comprises subjecting the record body to a magnetic field of intensity sufficient to magnetically saturate the magnetizable material of the body and thereafter to demagnetize the record body as completely as is practical so that it arrives at the recording head gap in a demagnetized state. Three general methods of accomplishing this erasing or demagnetizing conditioning of the record body have appeared: One is exposure of the magnet consecutively to two different field regions of a constant magnetic field. The first of these regions is of one polarity and is of sufficient intensity to saturate the record body. The second region is of opposite polarity and is of an intensity to demagnetize after its saturation in the first region. The second method comprises passing the record body through an alternating magnetic field of supersonic frequency. The magnet that produces this alternating field is so arranged that the record body is exposed, first, to one or several cycles of magnetic intensity of an amplitude to saturate it and, thereafter, is passed through a field region wherein the maximum magnetic field intensities progressively diminish. By exposure of the record body, after its saturation to several cycles of diminishing intensities and opposite polarities, the record body is demagnetized. The third method also employs an alternating magnetic field, but the field is of a frequency of some suitable power source such as commercial power line frequency. The principle of this type of erasing is quite similar to that of a high frequency erasing and involves exposure of the record body to a field region of saturating intensity followed by passing the body through a region of successively diminishing maximum field intensities wherein demagnetization is accomplished.

In certain situations of magnetic recording there is considerable danger that unintended erasing of a record body will occur after a recording has been made on it. Possibly the most usual occurrence of this kind is in the situation where the recording instrument is a combination instrument also capable of playing back recordings that it has made. In such case an operator, after making a recording, frequently will rewind the record body in order to hear what has just been recorded and forget to perform the necessary converting control operations that disable the erasing device and place the instrument in its playback condition. Rewinding of the record body past the erasing device while the latter is in its erasing condition destroys the recording that has been made. A very similar difficulty occurs in connection with the use of the high frequency bias recording that has at present become standard practice in commercial recording instruments. In brief, this involves energization of the magnetic recording head with alternating current of supersonic frequency as well as with the signal current of audio frequency. When a previously recorded record is moved past a head that is energized by the supersonic frequency current, the high frequency alternating field produced at the gap acts as an erasing field and therefore destroys the recording. Similar difficulties are apt to occur during threading of an instrument for playback when the instrument happens to be in its recording condition.

The present invention is directed to avoidance of these difficulties. It is applicable to instruments wherein the record body travels in a common path for both recording and reproduction, or travels in a very similar path that permits actual exposure of the record body to the high frequency field of the recording head or to the erasing action of the erasing device while the instrument is in its recording condition. More specifically, the invention is applicable to an instrument wherein either the erasing device or the recording and reproducing head is provided with a guide surface for properly locating a record relative to the erasing or recording element and against which the record body is pressed by a retractable pressure pad.

Figure 1:
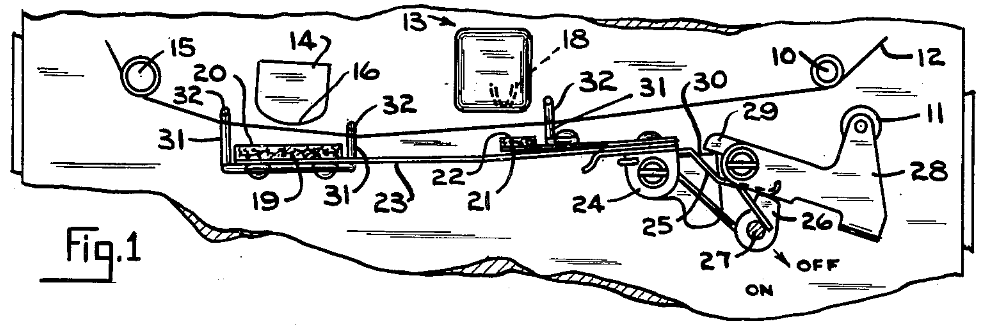
Figure 1 is a somewhat schematic diagram of the head mechanism of a combination recording and reproducing instrument, the mechanism being shown in idle condition for threading of a record body into it.
Figure 2:
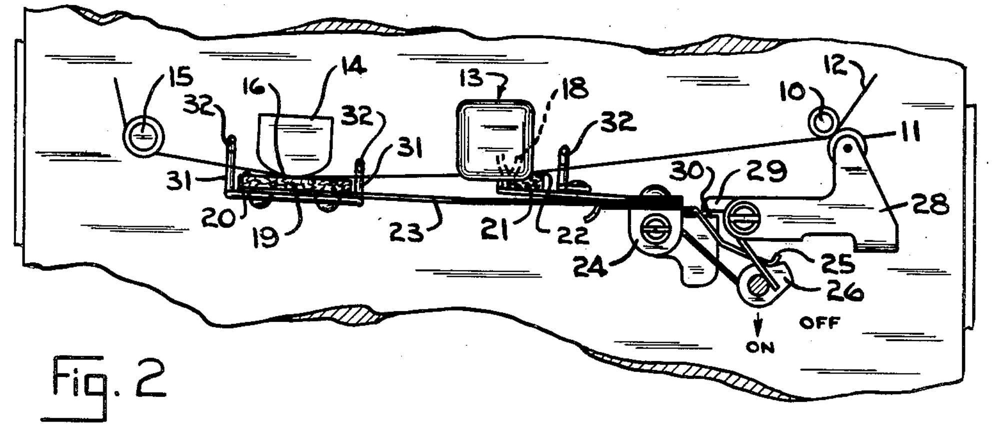
Figure 2 is a similar view showing the mechanism in operating condition.
Figure 3:
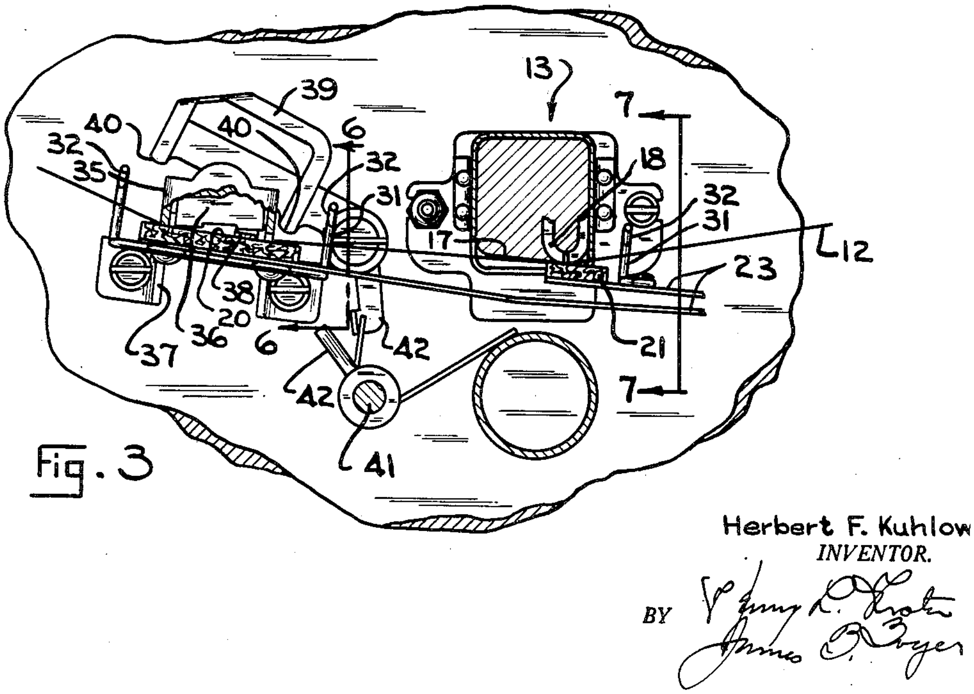
Figure 3 is an enlarged fragmentary view showing a horizontal section of the recording head and a specific type of permanent magnet erasing assembly, the assembly being shown in operating condition.
Figures 4, 5:
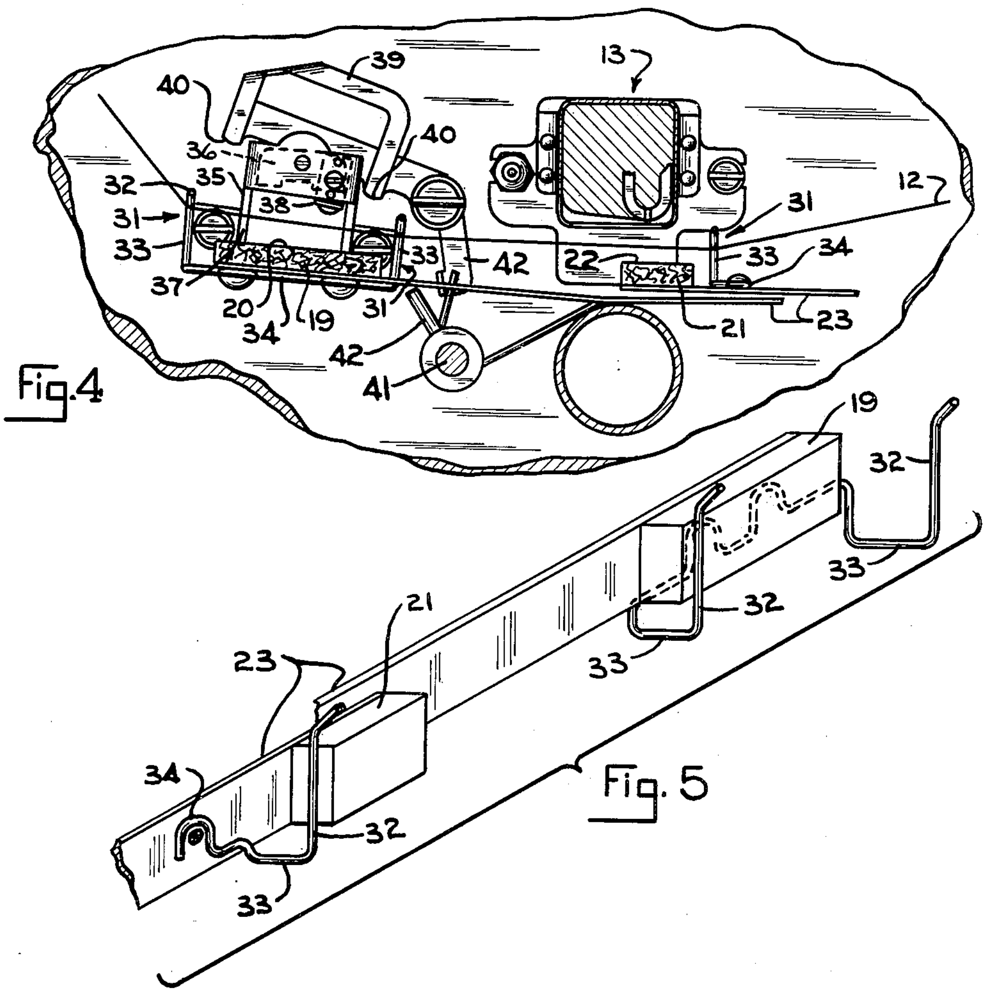
Figure 4 is a view similar to Figure 3, but showing the mechanism in idle condition.
Figure 5 is a perspective view of a desirable form of pullback system.
Figure 6:
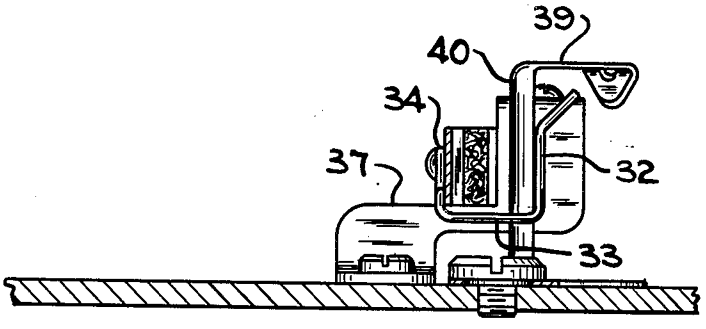
Figure 6 is a section on line 6—6 of Figure 3.
Figure 7:
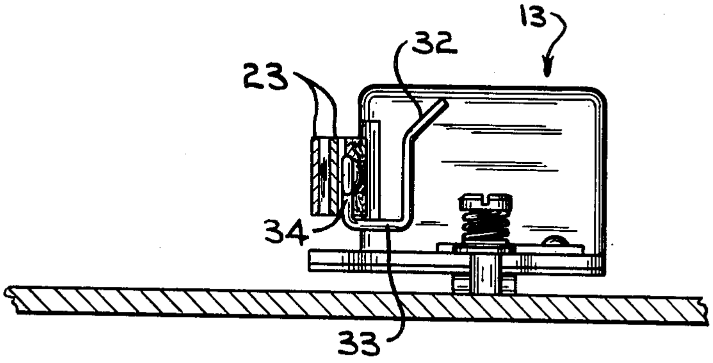
Figure 7 is a section on line 7—7 of Figure 3.

Describing the drawings in detail, and first referring to Figures 1 and 2, the magnetic recording and reproducing instrument mechanism therein shown are of the same type disclosed by the applications of Harold W. Bauman, Serial Number 194,914, Edmund Barany and Melvin Sackter, Serial No. 194,915, and Edmund Barany, Harold W. Bauman and Melvin Sackter, Serial No. 194,918, all filed November 9, 1950. It comprises a capstan roller 10 that is driven by a constant speed motor and between which and a pinch roll 11 a record body 12 is positioned for being advanced at constant speed past a recording and reproducing head 13 after having passed an erasing device 14. A guide pin 15 is provided at the entrance end of the record body path-defining system 10, 11, 13, 14.

The erasing device 14 may be either a high frequency device, a low frequency device, or a constant field device of the type disclosed by later figures and which is described and claimed in United States patent application of Edmund Barany, Melvin Sackter and Harold W. Bauman, Serial Number 194,917, filed November 9, 1950, and that of Edmund Barany and Melvin Sackter, Serial Number 194,916, filed November 9, 1950. This erasing device in any event, includes a record body guiding surface 16 which is disposed toward the record body path for contact with the record body to perform the erasing operation when the device 14 is in its erasing condition.

The recording and reproducing head 13, somewhat similar to the device 14, is provided with a record body path-facing surface 17 for contact by a record body for properly positioning the body relative to the non-magnetic gap provided by the magnetic circuit means 18. In the type of instrument in question a retractable pressure pad 19 is associated with the erasing device 14 and it is movable between an advanced position wherein it exerts pressure against the surface 16 for maintaining record body 12 in contact with the latter, this position being shown in Fig. 2, and a retracted position shown in Fig. 1, wherein its record body contacting surface 20 is spaced away from surface 16 and to the opposite side of the record body path from the latter. Associated with head 13 is a second pressure pad 21, and this pad also is movable between an advanced position shown in Figure 2 wherein it exerts pressure upon the surface 17 of head 13 to press a record body against the latter, and a retracted position shown in Fig. 1 wherein its record body contacting surface 22 is spaced from the head surface 17. These pressure pads 19, 21 may be mounted, in accordance with the disclosure of the above-identified Bauman application, upon flexible strips 23 that extend alongside the record body path to a common supporting device 24. This device 24, as is shown by Figs. 1 and 2, is rotatable between a position shown in Fig. 2 corresponding to the advanced positions of the pads 19, 21, and a second position shown in Fig. 1 corresponding to the retracted positions of the pads. Such rotation is accomplished by a lever 25 and a cam 26 that is mounted on a control shaft 27 that controls rotation of capstan roller 10 as by actuating a motor switch or a clutch. The pinch roll 11 is mounted in a swingable bracket 28 that has an operator portion 29 movable by a member 30 carried by the device 24. By this arrangement the movement of pads 19 and 21 and pinch roll 11 are coordinated. This mechanism is disclosed and claimed in application for United States patent of Edmund Barany and Melvin Sackter, Serial No. 194,915.

It will now be seen that, in the event of contact of record body 12 with guide surface 16 of the erasing device 14 while the latter is in its erasing condition, destruction of magnetization of the record will occur. Similarly, contact of the record body with the surface 17 of head 13 while the latter is energized by high frequency bias current will perform an erasing action on the record body.

In accordance with the present invention accidental erasing of either of these types is prevented while the pressure pads are in their retracted positions of Fig. 1 by pullback devices 31 that are associated with the respective pressure pads. These pullback devices respectively are mounted in association with the pads 19, 21 to have portions or members 32 lying to the opposite side of the record body from the record body contact surfaces 20, 22 of the respective pads and at such spacing from the latter surfaces that when the pads are in their retracted positions a record body lying between end surfaces 20, 22 and the pullback members 32 will be spaced away from the record body contacting surfaces 16, 17 of erasing device 14 and head 13. Desirably the pull back devices are made of wire and formed to have parts 33 that extend across the record body path between the parts 32 and parts 34 that are formed for mounting the devices in proper association with the pressure pads. By forming parts 33 to extend beneath the record body they form convenient means for supporting a tapeform record body 12 in a position for registration with contact surfaces 16, 17, 20, 22, while the pads are in their retracted positions, as during threading of the instrument.

A convenient mounting for the pullback devices is afforded by the elongate strips 23 that support the pads. As shown, the parts 34 of devices 31 are secured as by rivets or solder to the strips that support the pads 19, and 21 with which the respective devices are associated, and are so located alongside the ends of the pads 19, 21 as to lie alongside the erasing device 14 and the head 13 when the strips 23 and the pads are in their advance positions. The spacing between the record body contacting members 32 of the devices 31 and the pad surfaces 20, 22 is such that when the pads are in their advanced positions the members 32 lie spaced from the record body to the same side of it as lie surfaces 16, 17 and roller 10, that is to say, they are spaced to the rear of contact surfaces 16, 17. Therefore, no interference is provided by members 32 with contact of the record body with the surfaces 16, 17 when the pads are in their advanced positions. More than one pull-back device 31 may be associated with the eraser assembly or head, as shown by the pair of such devices mounted adjacent the opposite ends of pad 19 to lie beside the entrance and exit ends of the erase assembly. These devices are shown as being interconnected by a common mounting part 34.

In the arrangement of Figs. 3 to 7, the erasing assembly comprises a bracket 35 that supports a permanent magnet 36 for registration with a portion of the record body to be erased. Guide surfaces corresponding to surface 16 of Figs. 1 and 2 are provided, at the entrance end of the assembly by one of the bracket legs 37, and at the other end by a shim plate 38 that is adjustable in and out to fix the closeness of approach of the record body to the trailing magnet pole surface and thereby select intensity of the field region adjacent the latter surface through which the record body is passed. Associated with the magnet mounting and assembly is a frame 39 that has record body contact surfaces 40. This frame 39 is movable between advanced and retracted positions wherein respectively surfaces 40 are positioned to maintain the record body spaced from the guide surfaces above described and spaced to the rear of the guide surfaces to permit the record body to contact them. Swinging movement is accomplished from a control shaft 41 through linkage 42. In this assembly the pullback devices 31 are mounted on strip 23 that supports pad 19 in locations respectively to clear the leading and trailing surfaces 40 and to lie to the rear of those surfaces when frame 39 is in its advance position and to the rear of the guide surface of the shim plate 38 when the frame 39 is in its retracted position.

Similarly, the pullback device 31 associated with the head 13 is positioned to lie alongside the surface of the head shield 42 at the exit side of the head when pad 21 is in its advanced position.

It will be evident from the above that the herein-disclosed invention provides an effective, but very simple and inexpensive, means of preventing accidental erasing of a record body by a device that is capable of effecting the condition of magnetization of the record body while the latter is in contact with a guide surface of the device and during the time than a pressure pad associated with the device is pressing the record body against its guide surface and while the pressure pad is in a retracted position.

I claim:

1. In an instrument that is selectively convertible between a first condition for magnetically recording a signal on a traveling record body of magnetizable material, and a second condition for magnetically reproducing a signal from a varyingly magnetized traveling record body, and said instrument including a device having a record body-guiding surface and that is effective in the recording condition of the instrument to alter the condition of magnetization of a record body in contact with said surface, and an element that is movable between an advanced position to press a record body interposed between itself and said surface against the latter, and a retracted position spaced away from it; means for preventing, while said element is in its retracted position, unintended contact with said surface by a record body interposed between it and said element, comprising pullback means assembled with said element for engaging said record body during movement of said element to its retracted position and by moving with said element during such movement to withdraw the record body from contact with said surface.

2. In an instrument that is selectively convertible between a first condition for magnetically recording a signal on a traveling record body of magnetizable material, and a second condition for magnetically reproducing a signal from a varyingly magnetized traveling record body, and said instrument including a device having a record body-guiding surface and that is effective in the recording condition of the instrument to alter the condition of magnetization of a record body in contact with said surface, and an element that is movable between an advanced position to press a record body interposed between itself and said surface against the latter, and a retracted position wherein it is spaced away from it; means for preventing, while said element is in its retracted position, unintended contact with said surface by a record body interposed between itself and said element, comprising a hooklike structure assembled with said element and including a member projecting beyond the record body contact surface thereof in the direction of said device and in a location to lie alongside it while the element is in its advanced position and to extend past a record body interposed between said surfaces, and said structure including a second member positioned by said projecting member to lie alongside said device and to the opposite side of said guide surface from said element while the latter is in its advanced position and to lie spaced from said guide surface to the same side thereof as said element while the latter is in its retracted position.

3. In a magnetic recording and reproducing instrument that includes means defining a travel path for an elongate magnetizable and demagnetizable record body, and including a device having a record body-guiding surface on one side of and facing said path and said device being effective in the recording condition of the instrument to alter the condition of magnetization of a record body in contact with said surface, a pressure pad disposed to the opposite side of the path from said surface for pressing a record body against said surface, and a swingable elongate member extended alongside said path and supporting said pad for movement between an advanced position wherein it exerts pressure against said surface and a retracted position spaced away from it; means for preventing, while said pad is in its retracted position, unintended contact with said surface by a record body interposed between it and said pad, comprising a rebent element secured to said strip alongside said pad and projecting beyond the record body-contacting surface thereof in a location to lie alongside said device while the pad is in its advanced position, said element having a member projecting from said strip to one side of said record body path and a second member extended angularly from said first member to lie to the opposite side of said path from the pressure pad while the latter is in its advanced position and to lie in spaced relation to said path and to the same side thereof as said pad while the latter is in its retracted position.

HERBERT F. KUHLOW.

No references cited.